UNITED STATES PATENT OFFICE.

HERMANN BELGER, OF CULLERCOATES, ENGLAND.

COMPOSITION FOR AGGLUTINATING DUST.

1,107,880.     Specification of Letters Patent.     Patented Aug. 18, 1914.

No Drawing.     Application filed April 8, 1913. Serial No. 759,699.

*To all whom it may concern:*

Be it known that I, HERMANN BELGER, a subject of the King of Great Britain, residing at 2 West Houses, Cullercoates, in the county of Northumberland, England, have invented certain new and useful Improvements in Compositions for Agglutinating Dust, and of which the following is a specification.

This invention relates to the treatment of dust in mines and other places, where such dust is dangerous or otherwise objectionable when left in a free state, that is to the treatment of surfaces upon which dust may fall, or the surface of dust already deposited, hereinafter termed surfaces, so as to cause dust particles to adhere permanently together and to the surfaces upon which they rest, and to impart adhering properties to newly deposited dust, causing the latter to adhere permanently to the earlier deposited particles which have been thus treated and converting the deposited dust into a cohesive mass.

It has long been recognized that coal dust in mines, cork, flour and other dust in mills, and many other dusts in inclosed places are a grave source of danger owing to their liability of ignition when thrown and suspended in the air, and also owing to persons inhaling such dust when in free suspension especially when of a gritty nature.

The object of this invention is to prevent the continued free suspension of such dust in the air by preventing the particles of dust leaving any surface upon which the said particles have been deposited or with which they come in contact or adjacent to, and thus by anchoring such particles permanently preventing their being taken up by the air in circulation after they have once been deposited. This effect has hitherto been attempted by spraying water in mines and such like places, and in thus moistening the dust already deposited to prevent it rising when air is in rapid travel or circulation, but such water sprinkling does not prevent the liberation of many particles deposited after the application of the moisture, and after a short period of time, the water evaporating, frees the dust entirely and by disintegration in a still more finely divided state permits it to be raised into suspension in the atmosphere when the air circulates or is made to travel at high velocity.

According to this invention a composition or solution of the character to be described is applied as by means of a spray, upon the dust already deposited, or upon surfaces upon which dust may fall, such as on the floor, walls or other surfaces in mines and other places, or to special contrivances in such places, in such a manner that particles of dust may adhere permanently together and to the surfaces upon which they rest and impart adhering properties to more newly deposited dust causing the latter to adhere permanently to the earlier deposited particles, thus converting the already deposited dust into a cohesive colloidal mass continually removing the dust from the air and holding the same anchored to the surface from which it cannot be severed or disengaged even by the most violent currents or blasts of traveling air. Thus in the case of an explosion of gas in a mine, the explosion drives the air with great force and at high velocity, but being unable to raise the usual cloud of dust cannot communicate the ignition to an explosive dust mixture, and this has the effect of localizing and minimizing the effect of such explosion.

An example of solution suitable for carrying this invention into effect is composed of the following ingredients:—30% calcium chlorid—10% glue and—60% water.

As calcium chlorid does not decompose before say red heat, the said solution is especially suited for use in places where explosions are likely to occur, such as in coal mines, although equally efficacious in other places.

In making up the solution, the ingredients are placed in a vat in which without the application of heat or other mixing inducement the solution naturally takes place in about two or three days. Salt may be added, say 5% for the purpose of increasing its viscosity.

The proportion of calcium chlorid may be varied, and the less glue employed the less viscous does the solution become. Excess of glue, say an amount equal to the amount of calcium chlorid employed, prevents the dust sinking in the solution and thus would make the solution ineffective after a short time, while excess of calcium chlorid, say ten times that of the glue employed, prevents the dust from becoming securely anchored.

The particles of calcium chlorid become covered with glue when made into the solution before described and thus form a protected colloid in which the calcium chlorid is protected from evaporation and the glue coatings are maintained moist and soft. Obviously any equivalent of glue may be used in its stead.

The solution may contain magnesium chlorid in addition to the calcium chlorid and the other ingredients named.

I claim as my invention:

1. A composition for agglutinating dust, including calcium chlorid, glue and water.

2. A composition or solution for agglutinating dust, including from 15% to 35% of calcium chlorid, 5% to 10% of glue and 75% to 50% of water.

3. A composition or solution for agglutinating dust, including from 15% to 35% of calcium chlorid, 5% to 10% of glue, about 5% of salt and 75% to 50% of water.

4. A composition for agglutinating dust, said composition including calcium chlorid, magnesium chlorid, glue and water.

In witness whereof I have hereunto set my hand in the presence of two witnesses.

HERMANN BELGER.

Witnesses:
H. NIXON,
FRED H. DUKE.

Copies of this patent may be obtained for five cents each, by addressing the "Commissioner of Patents, Washington, D. C."